United States Patent [19]
Gierse et al.

[11] 3,877,119
[45] Apr. 15, 1975

[54] APPARATUS FOR CUTTING PILE FABRIC
[75] Inventors: Franz Josef Gierse, Wickrathberg; Hubert Holz, Krefeld; Ante Raguz, Huckelhoven, all of Germany
[73] Assignee: Franz Müller, Monchen-Gladbach, Germany
[22] Filed: May 23, 1973
[21] Appl. No.: 363,123

[30]     Foreign Application Priority Data
    May 29, 1972  Germany............................ 2226052

[52] U.S. Cl. ........................ 26/9; 83/425; 83/433; 139/291 C
[51] Int. Cl. ............................................ D06c 13/08
[58] Field of Search ...... 26/8 R, 8 C, 9, 10 R, 10 C; 83/327, 425, 433; 139/291 C

[56]         References Cited
          UNITED STATES PATENTS
    438,538    10/1890   Gadd.................................. 26/8 R
    448,088    3/1891    Smith et al.......................... 26/8 R
    1,630,132  5/1927    Molins............................... 83/327 X FOREIGN PATENTS OR APPLICATIONS
    28,401     6/1903    Switzerland........................ 83/425

*Primary Examiner*—Robert R. Mackey
*Attorney, Agent, or Firm*—Herbert L. Lerner

[57]         ABSTRACT

A cutting arm for a cutting machine for cutting velvet, corduroy or the like has one end of a cutting arm pivotally mounted on a frame for pivotal movement about a first axis. A cutting head having a cutting knife is mounted for pivotal movement about a second axis on the other end of the cutting arm. The first and second axes are disposed generally parallel to one another and actuating means are operatively connected between these axes to provide for pivotal movement of the cutting head relative to the cutting arm about the second axis as the cutting arm is pivoted on the frame about the first axis generally parallel to a web of material passing underneath the cutting head.

5 Claims, 5 Drawing Figures

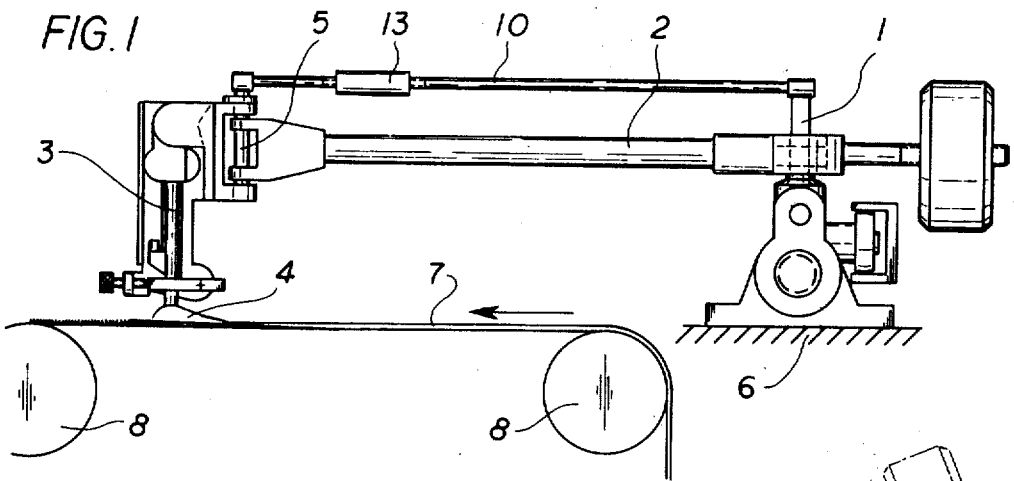
FIG.1
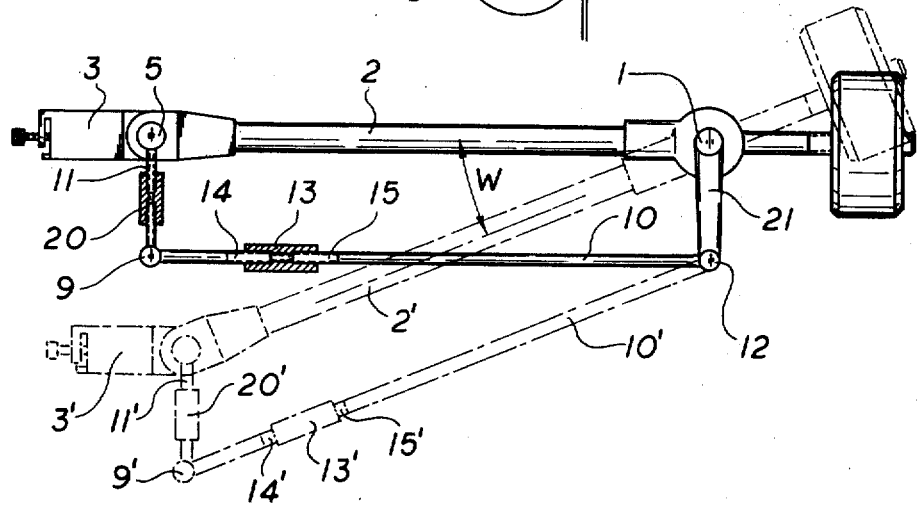
FIG.2
FIG.3

APPARATUS FOR CUTTING PILE FABRIC

This invention relates to a cutting arm for a fabric cutting machine. More particularly, the invention relates to a cutting arm which is supported, at the end opposite the cutting head carrying the cutting knife, on a pivot shaft connected with the frame of the machine in such a manner that the cutting arm can be laterally deflected or rotated in a plane approximately parallel to the surface of the web of material passing underneath the cutting head. If, in such a machine, the web of material is horizontally disposed in the region of the cutting knife, the cutting arm is therefore pivoted above the surface of the horizontally disposed web about a vertical axis and is supported for lateral movement in an approximately horizontal plane. This special arrangement is partly referred to in the following description without limitation of the general applicability and, therefore, only for the purpose of simplifying the terms.

In cutting machines used for cutting weft pile fabrics such as, for example, velvet, fine-ribbed stoppages and the like, the individual fabric loops are cut open by means of a cutting knife which is attached at the bottom of a cutting head of a cutting arm and which is introduced into the respective row of loops to be cut. The cutting is performed in a manner such that a sewed-together, endless web of material runs or travels at an appropriate speed against a stationary knife inserted into the row of loops. The web of material must run or pass through the machine as many times as it has rows of loops to be cut open over its width. At the cutting head, means are provided which ensure that in the event of faults in the fabric or in the cutting of any kind, the cutting knife is immediately and automatically pulled out of the material or lifted off of the material. At the same time, the machine is stopped, so that the fault can be corrected. Such machine stoppage cause considerable loss of time and should, therefore, be limited to the lowest possible number. As it is not economically possible or feasible to prevent the web of material from being slightly displaced during a run back-and-forth over the cutting range, provision has theretofore been made to suspend the cutting arm so that the cutting arm and therewith the cutting knife can freely follow the lateral movements of the web of material. With this arrangement, a slight lateral back-and-forth movement of the web of material in a cutting range, of for example, 5 rib widths, no longer leads to faulty cutting and thereby to the loss of machine time.

For modern-velvet-cutting machines with cutting speeds of 200 to 500 meters per minute, however, the above-mentioned suspension of the cutting arm with lateral deflection is no longer satisfactory. For example, in a cutting arm of the kind described above because the operating position of the cutting knife cannot be rotated relative to the cutting arm, lateral deflection of the cutting arm results in an inclination of the cutting knife by the same angle within the respective row of fabric loops. Because such inclination can, of course, easily lead to faulty cutting, the cutting arm in older machines used to be made so long that a deflection by a few rib widths was also practically equivalent to a parallel displacement of the cutting knife. In very-high-speed velvet cutting machines, however, it is not possible to make the cutting arm as long as in the aforementioned older machines, because strong vibrations caused by the considerable stresses are possible and this again can lead to faulty cutting.

It is also possible to provide appreciable reinforcement of the cutting arm to prevent the adverse affects of the vibrations because then its inertial mass would become too large and consequently, the cutting knife could no longer follow the lateral movements of the web of material or of the fabric loops to be cut readily enough. Accordingly, for these reasons faulty cutting must again be expected, and the number of errors will increase substantially with the cutting speed. If, on the other hand, a substantially shorter cutting arm is used, corresponding to the increased cutting speed, the knife will be at such an angle that small deflections of the cutting arm in the row of loops in question, will for this reason alone, result in frequent faulty cutting.

Added to this is the fact that in modern velvet cutting machines, which run about twice as fast as older ones, the inertial mass of the cutting arm must be increased because the mechanism for withdrawing the knife from the row of loops in the event of faulty cutting or the like can be realized only with very stable mechanical means. For example, electromagnets which were previously used for deflecting required too much time for building up the required magnetic field. The cutting head of modern velvet cutting machines can become still more compact if cutting knives with an adjustable setting angle are used. In such a case, the setting angle is the angle by which the knife blade is changed or varies from the normal relative to the surface of the web of material to be cut. Normally this angle is zero degrees, that is, the knife blade is perpendicular to the plane of the web of material. It has, however, been found that it may be advantageous to set the knife blade at an angle slightly off from this perpendicular, as the loop to be cut momentarily is attached less tightly on the one side, namely, in the already cut region, than on the other side.

In modern velvet cutting machines with cutting speeds of, for example, more than 200 meters per minute, there are many reasons for shortening the cutting arm substantially as compared to older machines of this kind, for examle, from the order of 1.0 to 1.5 meters to the order of 0.5 meters. A shorter cutting arm is more stable and, therefore, less vibration-prone, and a shorter cutting arm offers the possibility of making the cutting head more compact in the manner described without increase of the overall mass inertia of the cutting arm.

Accordingly, it is an object of the present invention to overcome the aforementioned disadvantages of known prior art devices and to provide a cutting arm which no longer has the disadvantage of the large inclination of the cutting knife provided for small lateral deflections. The aforementioned object is achieved according to the present invention, by providing that the cutting head is rotatably supported at the cutting arm about an axis which extends parallel to the pivot shaft of the cutting arm and that the cutting arm is supplemented to form a four-element crank mechanism, one element of which is firmly connected with the machine frame and another element opposite the one element is disposed at the cutting head.

With the above arrangement, any desired predeterminable deflection of the cutting knife can be superimposed on the deflection of the cutting arm. In this arrangement, the deflection of the cutting knife is as a rule predetermined so that the cutting knife is automatically set by the crank mechanism parallel to the longitudinal direction of the row of loops to be cut which is normally to be expected under the prevailing conditions.

In many cases, it is sufficient and advantageous if the crank mechanism, according to one embodiment of the invention, is designed as a parallel crank or a parallelogram guide of the cutting head or of the cutting knife attached thereto, in such a manner that the cutting knife is displaced parallel to itself when the cutting arm is deflected or rotated laterally.

Under certain conditions, however, it may be even more advantageous not to displace the cutting knife exactly parallel to itself when the cutting arm is deflected laterally, but to provide the possibility for the cutting knife to occupy a position with a tendency for displacement opposite to the guidance provided by a very long cutting arm. This desired tendency for displacement is based on the fact that the web of material receives the impulse for a lateral displacement normally far ahead of the cutting station in that it is displaced laterally by some external influence or condition. As the web of material passes through the machine, this lateral displacement will steadily decrease up to the cutting station. This means, however, that at the cutting location itself, a position of the angle opening from the center outward to the left or to the right, which is characteristic of the position of the cutting knife, is required in the case of a lateral deviation of the running of the material from the normal condition of a straight run.

According to a further feature of the present invention, it may, therefore, be advantageous to design the crank mechanism as a revolving, double swinging lever having a base member which is fixed at the machine frame or base and which is longer than the opposite member or link. This difference between the length of the base member and the link member is preferably adjustable and the deflection of the cutting knife caused thereby can thus be adapted to the respective requirements. Through such a double swinging lever, it is possible to provide that the tip of the cutting knife is displaced by a larger amount than the cutting head when the latter is deflected laterally. The deflection of the cutting knife tip is thus greater in that case with parallel displacement by a parallel crank mechanism.

Should it be desirable for any reason to deflect the tip of the cutting knife less than in the case of the parallel crank mechanism, the crank mechanism can be designed, according to a further feature of the invention, as a double crank. For this purpose, the base member fixed to the machine frame or base need only be made shorter than the opposite link member. With such a double crank, it is possible to provide for setting any cutting arm deflection or deflection angles of the cutting knife, at which the latter is progressively deflected more and more, starting with the parallel displacement toward the deflection angle of the cutting arm and beyond. The conventional, and in this sense, the fixed coupling between the longitudinal direction of the cutting arm and the cutting knife is thus a special case of the double crank.

From a mechanism point of view, the revolving double swinging lever and the double crank are two embodiments of the four-element crank mechanism, between which the parallel crank lies as the dividing-line. If, therefore, the difference between the base length and the link length is positive, the double swinging lever is obtained; if the difference is zero, the parallel crank is obtained; and if the difference is negative, the double crank is obtained. The coupling angle between the link and the base, which is zero for the parallel crank, assumes positive or negative, non-zero values for the double swinging lever as well as for the double crank.

When the cutting arm is deflected, the angle deviation described is in any case very small relative to the parallel displacement. This relatively small angle deviation, differs depending on the type of machine used and it is very advantageous to provide for a very sensitive, continuous, and easy-to-handle adjustment of the length of the link relative to the length of the base.

The crank mechanism according to the invention is preferably formed by a linkage. Using a parallelogram guide mechanism known per se from large windshield wipers and from drawing boards or modifications thereof, it is possible, according to the present invention, to provide a cutting knife which is guided, independently of the deflection angle of the cutting arm, and which is guided parallel to itself or with a desired deviation to the right or left and thereby also automatically parallel to the respective loops of the fabric.

However, the crank mechanism need not necessarily be formed by a linkage. According to the present invention, it may also be advantageously formed by coupling the pivot shaft of the cutting arm and the rotating shaft of the cutting head by means of a belt, chain, or gear coupling.

In the case of a belt drive, for example, the terms discussed above relating to the base and link of the four-element crank mechanism correspond to the radii of the pulleys of the belt drive. If with this kind of crank mechanism the deflection angle of the cutting knife is to be adjustable relative to the deflection angle of the cutting arm, it is advantageous to choose a drive with a continuously adjustable transmission ratio.

Other features which are considered as characteristic for the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is an elevational view of a fabric cutting arm arrangement according to one embodiment of the invention wherein the cutting arm is operable with a four-element linkage arrangement.

FIG. 2 is a top view of the fabric cutting arm arrangement shown in FIG. 1 and showing the cutting arm arrangement in two different positions, one position being shown by solid lines and the other position being shown by broken lines.

FIG. 3 is a top view of a cutting arm arrangement according to another embodiment of the invention wherein a belt or chain coupling is employed.

Figure 4:
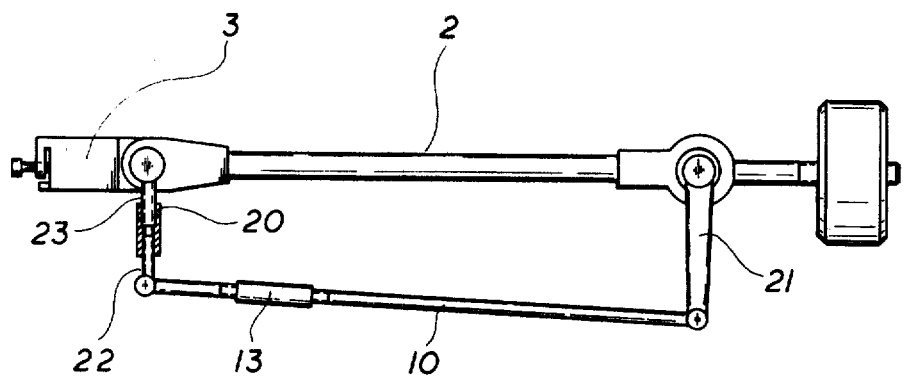
FIG. 4 is top view, similar to FIG. 2 but wherein the link 11 is shorter than the base arm 21.

Referring to the drawings, FIGS. 1 and 2 show a cutting arm 2 which is pivoted about a shaft 1. The cutting arm 2 at the end thereof opposite the shaft 1 rotatably mounts a cutting head 3 on a bearing shaft 5. The cutting head 3 carries a knife 4. The shaft 1 is firmly connected with the machine frame shown schematically at 6. A web of material 7 runs underneath the cutting knife 4 over rollers 8 in the direction of the arrow so that the knife 4 always cuts open a fabric loop.

A parallel crank or parallelogram guide arrangement is provided by which the cutting arm 2 is operably connected with the shaft 5 about which the cutting head 3 is rotatably supported. Thus, the parallelogram guide arrangement includes two rods, 10 and 11, a base arm 21 and the cutting arm 2. The rod 11 extends from the shaft 5 and is pivotally connected to the rod 10 at pivotal connection 9. The base arm 21 is fixed to the machine frame and extends from the axis of the shaft 1. The outer end of the base arm 21 is pivotally connected to the rod 10 at pivotal connection 12. As expected in parallelogram guide arrangement, the cutting head 3 and therewith the cutting knife 4 (not shown in FIG. 2) is displaced parallel to itself when the cutting arm 2 is deflected or rotated through the angle W. FIG. 2 shows in broken lines an example of a cutting arm arrangement, according to the invention, in which the cutting arm 3 has been deflected or rotated through the angle W. In FIG. 2 the corresponding reference numerals on the broken line representation are provided with a prime.

For the initial adjustment of the cutting knife 4, a threaded sleeve 20 in the link 11 may be turned, for example. After turning the threaded sleeve 20 in the link 11, it may be necessary to again align the position of the cutting head 3 parallel to the direction of travel of the material 7 or it may be desirable that the edge of the cutting knife 4 be disposed so that it is not parallel to the position of the cutting arm 2 for the angle position $W = 0°$. A slight inclination of this kind of a few degrees of arc may be advantageous because of a correspondingly inclined web of material 7 or due to special requirements of the fabric to be cut.

In such cases it was possible to adjust the cutting knife by bending. However, such bending is frequently not only inaccurate, but also detrimental to the mechanism of the cutting head. Surprisingly, however, such a desired, inclined positioning of the longitudinal direction of the cutting knife 4 can be carried out with the suspension of the cutting arm according to the invention without difficulty and in a controlled manner in that it is sufficient to shorten or lengthen one of the rods 10 or 11 of the crank mechanism accordingly. For instance, a correction of the position of the cutting head 3 or a desired inclination of the position of the cutting knife 4 can be carried out in an accurate and controlled manner if the rod 10 is divided into two parts and these two parts are connected at their two ends 14 and 15 by means of a threaded sleeve 13 having oppositely directed threads. By means of such a threaded sleeve 13 the length of the rod 10 can be changed in a simple manner and can also be measurably adjusted with the aid of suitable indicating means.

The threaded sleeve 20 in link 11 is made similar to the sleeve 13 and according to the invention, it is also possible by adjusting the threaded sleeve 20, in a simple manner as explained above, to change the parallel crank shown into a revolving, double swinging lever or into a double crank. In the former case, the threaded sleeve 20 is turned so that the link 11 is shortened relative to the base arm 21, and in the other case the link 11 is lengthened relative to the base arm 21.

Figure 5:
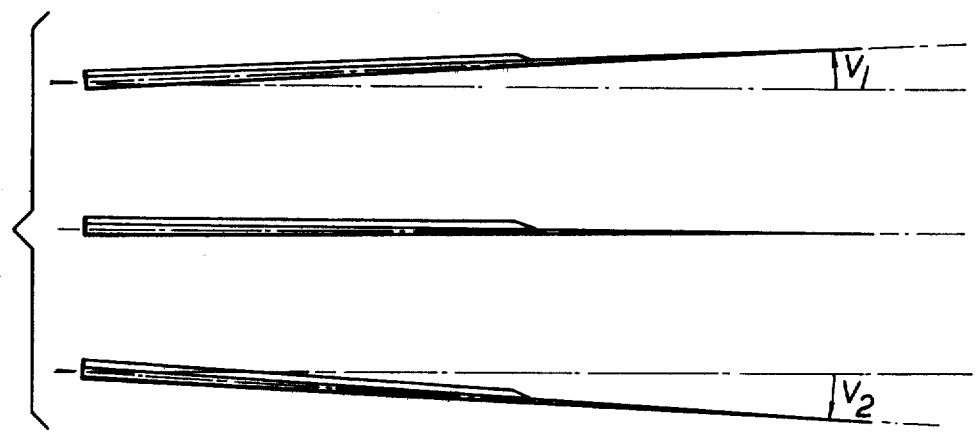
FIG. 5 is a schematic representation showing various adjustable positions of the cutting knife.

FIG. 4 shows an example of a double swinging layer formed in this manner. In FIG. 4 the link 11, consisting of the parts 22 and 23 as well as the threaded sleeve 20, is shorter than the base arm 21. As in the embodiment of FIGS. 1 and 2, the cutting head 3, 4 of the embodiment of FIG. 4 is fixed to the shaft 5, and the latter is pivotable within the cutting arm 2. FIG. 5 shows how in a crank mechanism designed as a double swinging lever, the cutting knife is not displaced with a parallel disposition but is displaced with a rotation of its own when the cutting arm 4, arranged with the linkage according to FIG. 4, is deflected or rotated so that the tips of the cutting knife are deflected outward by the angle V1 or V2, respectively.

FIG. 3 relates to an alternate embodiment and shows the principle of the suspension of a cutting arm wherein there is provided a belt or chain coupling of the cutting arm pivot shaft 1 with the cutting head 3. The coupling means may comprise, for example, a notched belt or a roller chain 16. The coupling means 16 passes over the two wheels 17 and 18. The wheel 17 is firmly mounted on the shaft 1 and thereby has its axis fixed relative to the machine frame 6. The wheel 18 is mounted on the cutting head 3 and fixed to the shaft 5. The cutting arm 2 is again supported for rotation about the shaft 1 and carries at the end opposite the shaft 1, the shaft 5 about which the cutting head 3 can rotate.

It will be seen from the broken line portion of the drawing according to FIG. 3, on which the same numerals are used but the addition of a prime, that the cutting head 3 rotates about shaft 5 when the cutting arm 2 is swung through the angle W, and thereby the cutting knife is also displaced parallel to itself. This parallel displacement takes place, as in the example of the embodiment according to FIG. 2, on a circular path or radius 19, the center or pivot of which is the axis of the shaft 1.

Also, in the example of the embodiment according to FIG. 3, it is possible, by changing the transmission ratio between the wheel 17 and the wheel 18 to generate a position of the cutting knife 4 deviating or differing from the purely parallel displacement of the cutting head 3 and, therefore, of the cutting knife 4, to thereby obtain an operating arrangement, when the cutting arm is rotated, according to the arrangement heretofore described in connection with the embodiment in FIGS. 4 and 5. In addition, it is easily possible by turning the wheel 17, optionally in a measurably adjustable manner, relative to the shaft 1 or the machine frame, or by turning the wheel 18 relative to the cutting head 3, to obtain a correction of the position of the cutting head 3 or any desired inclined position of the needle relative to the normal position ($W = 0°$) of the cutting arm 2 or relative to the longitudinal direction of the respective fabric rib to be cut.

We claim:

1. A cutting arm device for a cutting machine for cutting the individual loops of a weft pile fabric such as velvet, corduroy, or the like comprising a frame, a cutting arm having one end thereof pivotally mounted on said frame for pivotal movement about a first axis, a cutting head pivotally mounted on the other end of said cutting arm for pivotal movement about a second axis, said cutting head carrying a cutting knife for cutting the pile loops of a web of material passing underneath said cutting head, said first and second pivotal axes being disposed generally parallel to one another, and actuating means operatively connected between said first and second pivot axes providing for pivotal movement of said cutting head relative to said cutting arm about said second axis as said said cutting arm is pivoted on said frame about said first axis, and cutting arm being pivotal in a plane substantially parallel to the plane of said web of material passing underneath said cutting arm, said actuating means comprising a base crank fixed relative to said machine frame and extending from said first pivot axis, a first link fixed relative to said cutting head and extending from said second axis, a second link having one end pivotally connected to said first link at a third pivot axis and another end pivotally connected to said base crank at a fourth pivot axis, and including means for adjusting the length of said first link.

2. A cutting arm device for a fabric cutting machine for cutting the individual loops of a weft pile fabric such as velvet, corduroy, or the like comprising a frame, a cutting arm having one end thereof pivotally mounted on said frame for pivotal movement about a first axis, a cutting head pivotally mounted on the other end of said cutting arm for pivotal movement about a second axis, said cutting head carrying a cutting knife for cutting the pile loops of a web of material passing underneath said cutting head, said first and second pivotal axes being disposed generally parallel to one another, and actuating means operatively connected between said first and second pivot axes providing for pivotal movement of said cutting head relative to said cutting arm about said second axis as said cutting arm is pivoted on said frame about said first axis, said cutting arm being pivotal in a plane substantially parallel to the plane of said web of material passing underneath said cutting arm, said actuating means comprising a base crank fixed relative to said machine frame and extending from said first pivot axis, a first link fixed relative to said cutting head and extending from said second axis, a second link having one end pivotally connected to said first link at a third pivot axis and another end pivotally connected to said base crank at a fourth pivot axis, the distrance between said first and fourth axes being unequal to the distance between said second and third axes.

3. A cutting arm device according to claim 2 wherein said actuating means comprises linkages defining a parallelogram with said cutting arm whereby said cutting knife is displaced parallel to itself when said cutting arm is pivoted about said first axis.

4. A cutting arm device according to claim 2 wherein the distance between said first and fourth axes is greater than the distance between said second and third axes such that the cutting blade mounted on the cutting head is disposed at an acute angle relative to the direction of travel of said web of material when said cutting arm is pivoted from a first position in which said cutting arm is generally parallel to said direction of travel of said web to a second position in which said cutting arm is disposed at an acute angle relative to the direction of travel of said web.

5. A cutting arm device according to claim 2 wherein the distance between said first and fourth axes is less than the distance between said second and third axes such that the cutting blade mounted on the cutting head is disposed at an acute angle relative to the direction of travel of said web of material when said cutting arm is pivoted from a first position in which said cutting arm is generally parallel to said direction of travel of said web to a second position in which said cutting arm is disposed at an acute angle relative to the direction of travel of said web.

* * * * *